Jan. 6, 1942.  C. M. EASON  2,268,578
CONE CLUTCH FOR PUNCH PRESSES
Filed Jan. 19, 1938  5 Sheets-Sheet 3

Inventor:
Clarence M. Eason
By Byrnes, Jackson, Britteles & Dienner
Attys.

Patented Jan. 6, 1942

2,268,578

UNITED STATES PATENT OFFICE 2,268,578

CONE CLUTCH FOR PUNCH PRESSES

Clarence M. Eason, Waukesha, Wis.

Application January 19, 1938, Serial No. 185,679

24 Claims. (Cl. 192—24)

The present invention relates to an improved cone clutch for punch presses. Numerous attempts have heretofore been made to devise a satisfactory friction clutch for punch presses in an effort to avoid the well-recognized objections to the use of a positive jaw clutch in this field of work. However, despite many ingenious designs of disk, cone, shoe and other types of friction clutches, the conventional jaw clutch or pin clutch still remains the preferred construction for punch press operation, such success as the friction type of clutch has enjoyed in this field being confined almost entirely to light duty installations in presses of relatively small capacity or power. The positive characteristic of the jaw clutch insures that the full momentum of the flywheel or other driving parts will be delivered to the ram at the instant of peak load without any possibility of slippage of the clutch parts. Also, the conventional operating controls which have been developed for engaging and releasing these jaw clutches have attained a relatively high degree of reliability for avoiding the very serious hazard of accidental engagement of the clutch and accidental repeat operation of the press. However, the very high shock wear which is unavoidable in a positive jaw clutch necessitates frequent repairs and replacements of the clutch parts, which, in addition to the cost of such repair operations and parts, frequently introduces a much higher loss in the amount of time that the press is out of operation. Furthermore, by reason of the shock wear which is inherent in a jaw clutch, very definite limitations are encountered in attempting to speed up the operation of the average heavy duty press. Some of these limitations also arise from the necessity of having to provide sufficient angular clearance space between interengaging jaws to assure complete inward throw of the shiftable clutch element, such clearance space introducing a variable interval of delay. Another objection to the jaw clutch in this field of work is the noise recurring with each clutch engagement and backlash of the clutch parts, such objection being decidedly significant from the standpoint of operator's fatigue.

Such prior friction clutches as I have known to be installed in heavy duty presses have failed principally because of slippage of the clutch surfaces. Extremely high torque loads are built up almost instantaneously when the punch or die parts strike the work, and these loads may be maintained for an appreciable interval when performing punching and shaping operations in succession or when using progressive dies. Appreciable slippage between the friction surfaces under these extremely high peak loads will rapidly wear the friction surfaces and aggravate the slippage to the point that the ram will not complete its power stroke. The use of exceptionally heavy spring pressures in an effort to avoid slippage brings about complications and rapid wear in the clutch engaging and releasing mechanism. Moreover, while a conventional friction clutch ordinarily avoids objectionable shock load upon engaging, some of these prior clutches provided with special engaging and releasing mechanisms designed for use on punch presses have proven unsatisfactory because of the highly destructive shocks created in the clutch releasing operation.

The general object of the present invention is to provide a cone clutch for punch presses embodying an improved construction of servo mechanism which utilizes the aforementioned high torque loads to boost the engaging pressure between the clutch surfaces to an extremely high value. This servo mechanism comprises an improved arrangement of coacting helical splines, formed on inner and outer servo members which are interposed between the driven clutch element and the crank shaft of the press. Initial engagement of the clutch surfaces for starting the ram downwardly is effected by a relatively light spring action, followed by just sufficient servo action to overcome the inertia of the crank and ram and the friction of the band brake. Hence, there is no shock in the operation of engaging the clutch. The full effect of the servo action arises when the punch or die parts strike the metal, at which instant the resulting torque peak operates through the servo mechanism to forcibly screw the two clutch elements into extreme pressure engagement for transmitting the full momentum of the flywheel or other driving parts to the ram.

By proper proportioning of the servo mechanism, this pressure engagement can be made sufficiently high to transmit, without slipping, any torque which the press is capable of withstanding. As soon as the punching or shaping operation is completed, the immediate reduction in torque releases this extreme pressure engagement between the clutch surfaces. Hence, the clutch surfaces can be released during the up stroke of the ram without objectionable stress or shock in the releasing mechanism. It should be noted in this regard, that it is the practice in many shaping or drawing operations to support the relatively stationary die on heavy cushion springs carried by the bed of the press. These cushion springs exert an up thrust or negative torque on the ram and crank shaft during a short part of the return motion of the ram, and this countertorque aids materially in releasing the servo mechanism.

Another object of the invention is to provide improved control mechanism for engaging and releasing the clutch. This control mechanism embodies improved means for preventing the possibility of accidental repeating of the press. For example, if, by reason of wear of the band brake or improper adjustment thereof, the crank shaft does not come to rest substantially at the top of its stroke, but instead coasts on through dead center position and starts on its downward movement, such additional movement of the crank is positively prevented from tripping the clutch and causing a repeat operation of the press. That is to say, once the clutch has been released, it cannot become accidentally engaged again no matter how far the crank shaft should coast beyond its upper dead center position, but can only become engaged by a deliberate tripping of the control mechanism under the action of the operator. One of the features of this control mechanism is a unique angular relation of the roller latch with respect to the cam plate, whereby the rotating contact of the roller latch with said plate tends to feed the roller latch inwardly on to a circular safety land formed on the cam plate.

Other objects and advantages of the invention will appear from the following detailed description of one preferred embodiment thereof. In the accompanying drawings illustrating such embodiment.

The punch press illustrated is intended to be representative of any desired type or construction of press to which it may be desired to apply my improved cone clutch. In general, the frame of the press comprises the side standards 14, the bed plate 15 mounted on the bolster plate 16, and the vertical guides 17 secured to the inner sides of the standards 14. The ram or slide 18 reciprocates vertically in the guides 17 and has operating connections through a connecting member 19 with the crank portion 21a of the crank shaft 21, the latter being journalled in the upper portions of the side standards 14. The frame of the press is mounted on the supporting base 22 in such manner that the press can be tilted backwardly to different angles, such tilting adjustment occurring about the pivot bolts 23 upon the actuation of the adjustable threaded connections 24, the frame being locked in any adjusted position by the clamping bolts 25.

Figure 1:
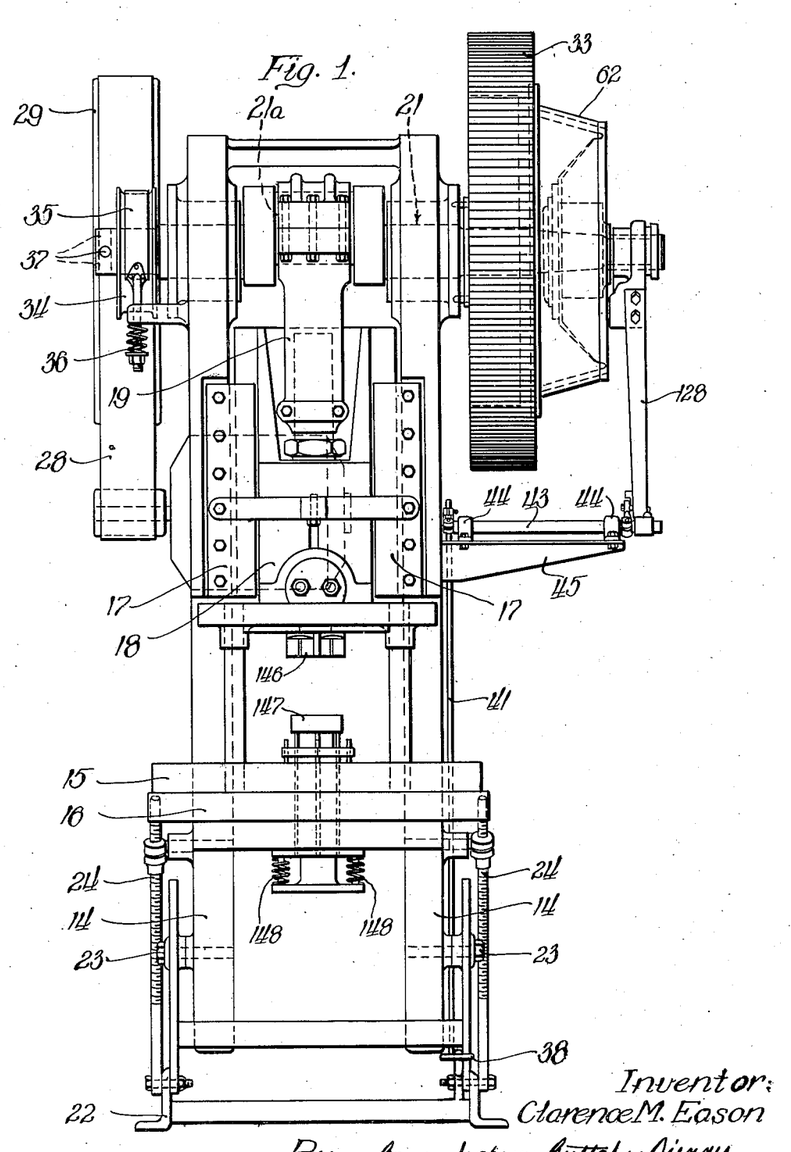
Figure 1 is a front elevational view of a punch press incorporating my improved clutch.
Figure 2:
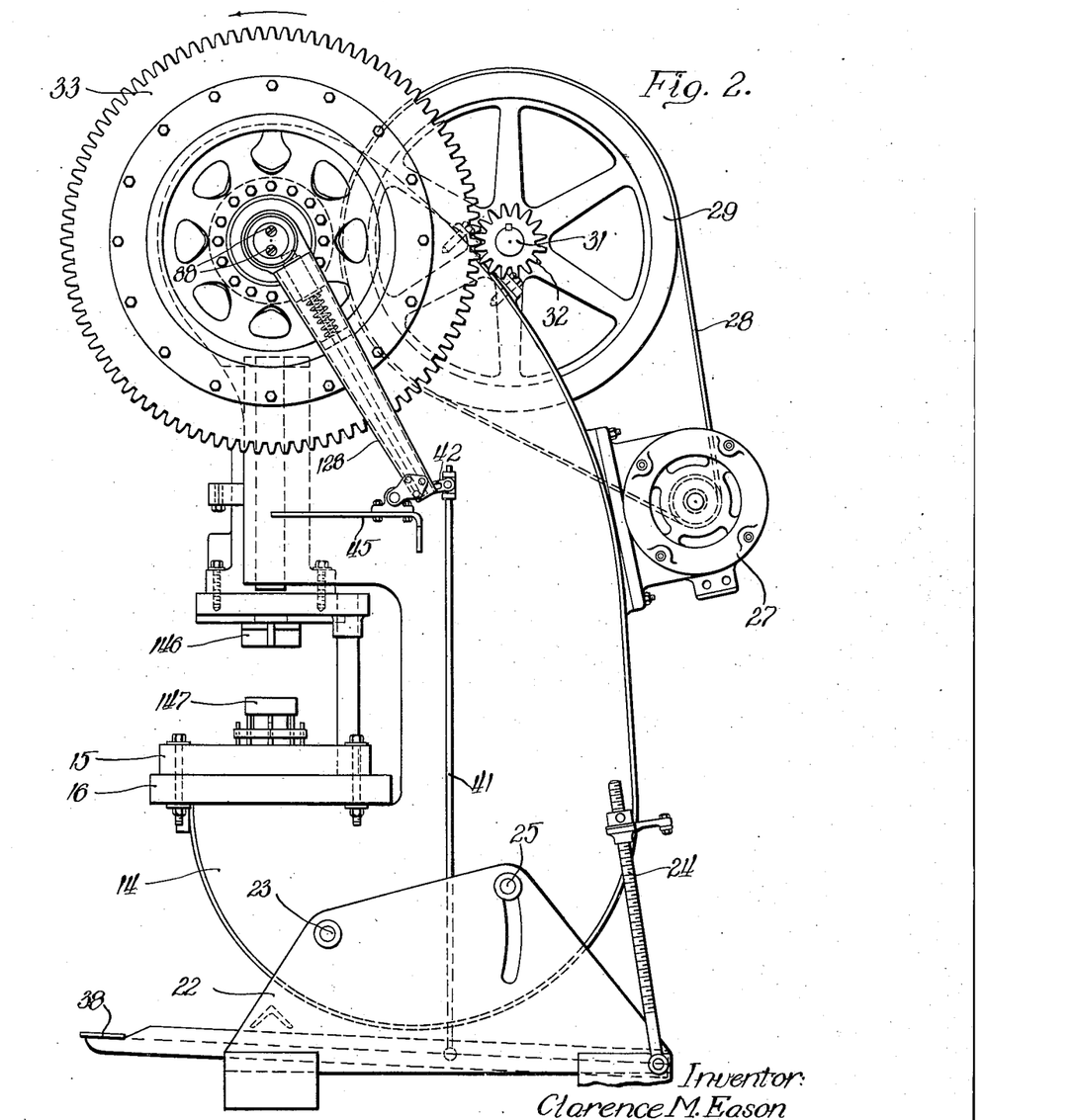
Figure 2 is a side elevational view thereof.
Figures 6, 7, 8, 9, 10:
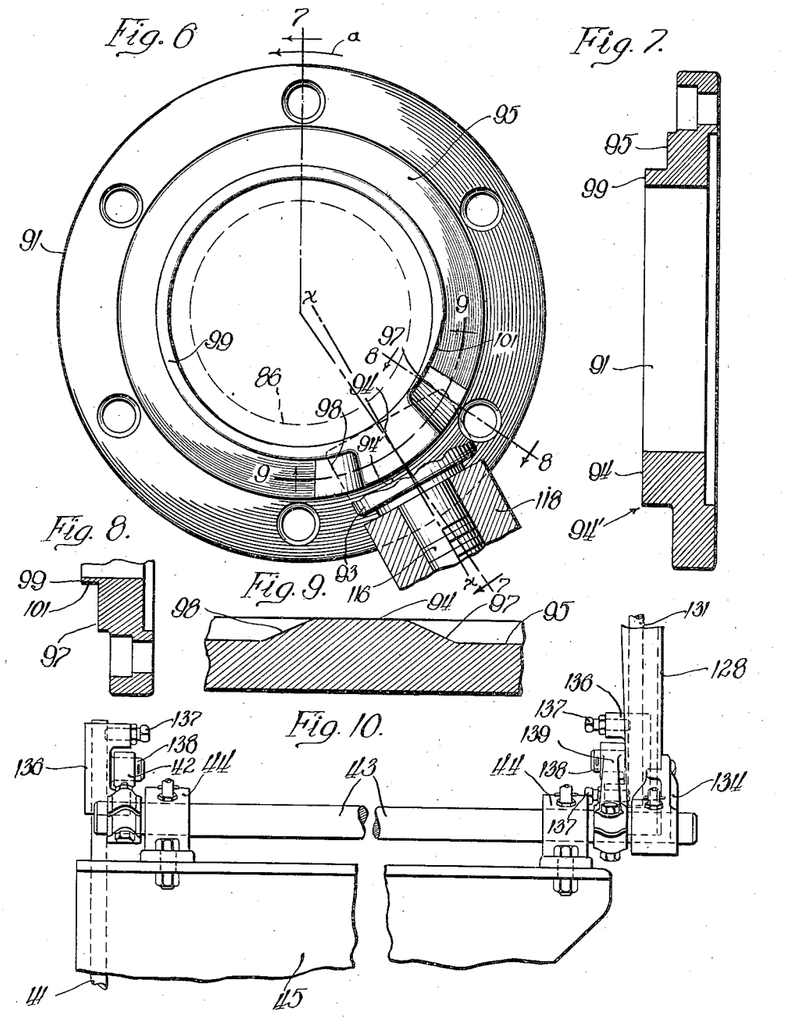
Figure 6 is a front elevational view of the cam plate of my improved control mechanism.
Figures 7, 8, and 9 are sectional view of this cam plate taken approximately on the planes of the lines 7—7, 8—8, and 9—9, respectively, of Figure 6.
Figure 10 is a fragmentary elevational view of part of the operating linkage for the control mechanism.
Figure 11:
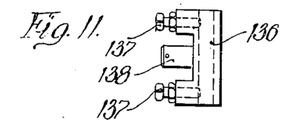
Figure 11 is an elevational view of one of the adjustable pivot supporting sleeves used in this linkage.

I have illustrated a back geared press employing a belt drive, but it will be understood that the press may have a direct gear drive or a direct belt drive. In the construction shown, the electric motor 27 is mounted on the back of the frame (Figure 2) and is connected through a belt 28 with a flywheel 29 disposed to one side of the frame. This flywheel is secured to a countershaft 31 which has a bearing support on the back of the frame and which carries a pinion 32 at its other end. Said pinion meshes with a large bull gear 33 which is rotatably mounted on one end of the crank shaft 21. Secured to the other end of said crank shaft is a brake drum 34 over which engages an adjustable spring loaded brake band 35 which imposes sufficient braking retardation on said drum to stop the crank shaft in its upper dead center position after the clutch is released. The adjustable spring device for varying the braking retardation exerted through said brake band is indicated at 36. A plurality of radially extending holes 37 in this end of the crank shaft are adapted to receive a pry bar when it is desired to turn the crank shaft by hand in the operation of setting or adjusting the dies. The control mechanism for the clutch comprises the conventional foot treadle 38 which is pivotally supported at its rear end on the supporting base 22 and which is operatively connected through a rod 41 with a motion transmitting arm 42 which is mounted on a rock shaft 43. As shown in Figures 1 and 10, this rock shaft is journaled in bearings 44 secured to a bracket 45 which projects outwardly from the adjacent side standard 14 of the frame. The operative connections established through this rock shaft with the roller latch of the tripping mechanism will be later described.

Figures 4, 5:
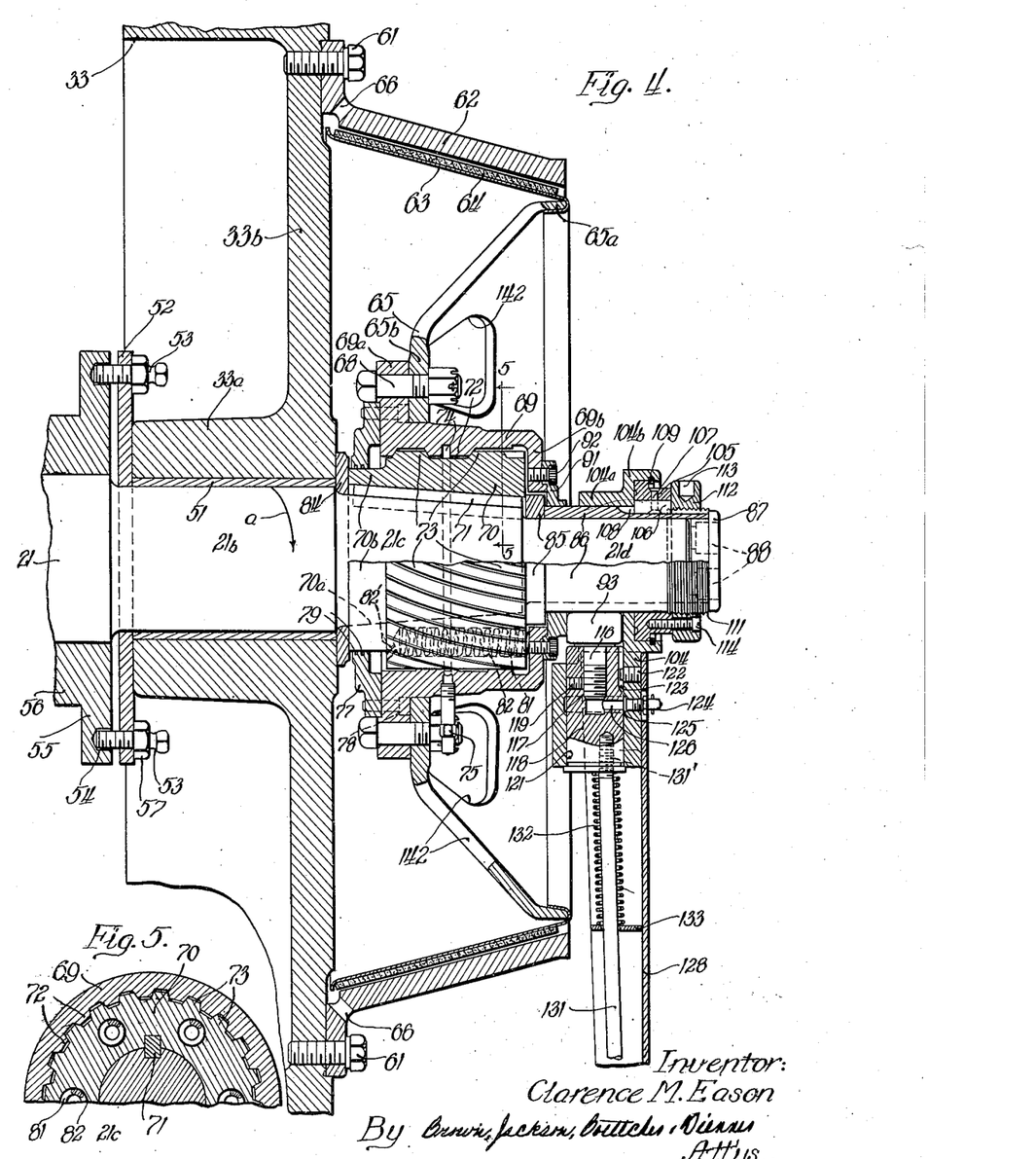
Figure 4 is an axial sectional view taken approximately on the plane of the line 4—4 of Figure 3.
Figure 5 is a fragmentary sectional view taken approximately on the plane of the line 5—5 of Figure 4.

Referring now to the construction of the clutch, particularly as shown in Figure 4, it will be seen that this end of the crank shaft 21 is formed successively with a cylindrical bearing portion 21b, a reduced tapered portion 21c, and a reduced cylindrical end portion 21d. The bearing portion 21b has the hub 33a of the bull gear 33 revolvably mounted thereon, a renewable bearing bushing 51 being interposed between said hub and said shaft. End play of the bull gear along the crank shaft is prevented by an adjustable non-rotating thrust plate 52 which is adapted to abut against the inner end of the gear hub 33a and hold the gear displaced outwardly to the limit of its movement on the bearing portion 21b. This thrust plate carries a plurality of adjustable set screws 53 which thread through tapped holes in the thrust plate and have their inner ends seating in sockets 54 which are formed in a flange 55 projecting from the adjacent frame bearing 56 in which the crank shaft is journaled. Adjustment of these screws enables the thrust plate 52 to be shifted to the right for taking up wear between the parts, the screws being held in adjusted positions by the check nuts 57. It will be understood that in a direct belt driven type of press, a belt driven flywheel will be substituted for the bull gear 33.

Secured to the web portion 33b of said bull gear, by bolts or screws 61, is the driving cone 62 of the cone clutch. The cooperating driven cone 63 preferably consists of a light gauge shell which may be punched or spun to the desired form. The clutch lining 64 can be secured to either cone, although replacement of the lining is facilitated by securing it to the inner driven cone 63. This lining preferably consists of spiral or helical segments. A substantial bearing tolerance is usually provided between the bearing bushing 51 and journal portion 21b of the crank shaft, and one of the objects of constructing the cone 63 in the form of a thin shell is to give this cone sufficient resiliency to accommodate any eccentricities which may exist between the two cones as a result of the aforementioned bearing clearance. This resiliency of the cone 63 minimizes wear of the clutch lining 64 and also results in a softer, more yielding engagement of the clutch by assuring that all portions of the two clutch surfaces engage with substantially equal pressure. The outer edge of the shell 63 is bent inwardly and welded to the outwardly directed flange 65a of a web member 65. This inwardly curved portion of the shell 63 projects outwardly beyond the plane of the adjacent end of the outer cone 62, whereby any lubricant which may drop upon or be thrown out against the web member 65 will be projected from this inner cone assembly in such manner that it will not accumulate on the inner friction surface of the outer cone 62. Angularly spaced holes 66 are also provided in the larger end of the cone 62 for discharging any lubricant which might flow outwardly along the web 33b of the bull gear.

The cone angle of the clutch surfaces is shown as inclined approximately 14 degrees from the clutch axis, this approximate angle not being essential for all situations but being preferable for the punch press utility herein described. For manufacturing convenience, the web member 65 may consist of the disk of an automobile wheel. The inner flange 65b of said web member is secured by bolts 68 to the outwardly extending flange 69a of the outer servo member 69. This outer servo member also functions as a supporting hub for the driven clutch element 63. The inner servo member 70 consists of a short cylindrical driven member which has a tapered bore 70a engaging with a tight fit over the tapered portion 21c of the crankshaft. A longitudinal driving key 71 seats in matching keyways formed in the servo member 70 and in the tapered portion 21c of the crank shaft. Formed internally in the servo member 69 and externally on the servo member 70 are cooperating helical splines 72 and 73 respectively. With the parts adapted to rotate in the direction indicated by the arrow a (Figure 4), these helical splines have a righthand direction of lead so that torque transmitted from the servo member 69 to the servo member 70 tends to cause the outer servo member 69 to be screwed axially towards the right. In actual practice I have employed a pitch angle of 23 degrees for these helical splines and have obtained entirely satisfactory results. However, this pitch angle may be varied for different operating conditions. By having the splines inclined at this relatively small angle to the axis of the servo members 69—70, the servo mechanism is made axially releasable under all operating conditions. By axially releasable, I mean the servo mechanism and clutch are releasable by the application of a releasing force applied axially of the servo mechanism. As hereinafter described, this axial releasing force is created by the cam and roller latch mechanism. A complete annular channel 74 is formed internally within the outer servo member 69, cutting through the internal splines 72 of this member. Said channel serves to conduct lubricant to the engaging faces of all of the helical splines, the substantially central location of this channel insuring distributed lubrication of all of the spline surfaces as the lubricant works outwardly towards the ends of the splines. A lubricant fitting or nipple 75 screws into a radial bore in the outer servo member 69 and communicates with the lubricating channel 74. An end cap 77, which is secured to the flange 69a of the outer servo member by screws 78, is provided with lubricant sealing rings 79 arranged to bear against a cylindrical inner neck portion 70b of the inner servo member for preventing leakage of lubricant. The other end of the outer servo member 69 is formed with an inwardly extending flange 69b adapted to receive end thrust from a plurality of compression springs 81. These springs are seated in a plurality of angularly spaced bores 82 extending longitudinally in the inner servo hub 70, there being six or more of such bores, as indicated in Figure 5. Springs may be assembled in all of the bores, or only in a few of the bores, and springs of greater or lesser deflection pressure may be used. Thus, the effective pressure of the springs 81 is capable of being varied for obtaining different initial engaging pressures of the clutch. The aggregate pressure of these springs need only be sufficient to engage the clutch members with enough pressure to drive the crank shaft and ram downwardly for engagement with the work. As previously described, the very large increase in torque which arises as soon as the punch or die parts strike the blank operates through the helical splines 72 and 73 to exert a very large axial force for forcing the shiftable clutch element 63 into high pressure engagement with the driving clutch element 62.

If desired, lubricant by-pass holes 82' may be drilled to extend from the inner ends of the bores 82 to the outer left-hand end of the inner servo member 70 for preventing any possibility of trapping of the lubricant at either end of said inner servo member in the shifting movement of the outer servo member 69.

Interposed between the inner end of the inner servo member 70 and the outer member of the bull gear hub 33a is a thrust ring 84 which abuts a shoulder at the outer end of the cylindrical shaft portion 21b, said thrust ring defining the outward limit of movement of the bull gear hub and the inward limit of movement of the inner servo hub. Another thrust ring 85 slips over the cylindrical shaft end 21d and abuts the outer end of the servo hub. Extending beyond this ring is a sleeve 86 which is forcibly held against said ring by a flanged end cap 87 bearing against the outer end of the sleeve. The end cap is secured to the end of the crank shaft by two cap screws 88 which have their heads seated in counterbores in the end cap and which have their threaded shanks screwing into tapped holes in the end of the shaft.

Referring now to the cam and roller latch tripping mechanism, a circular cam plate 91 is rigidly secured to the end flange 69b of the outer servo member by screws 92. Cooperating with said cam plate is a roller latch 93 which is adapted to be reciprocated substantially vertically into and out of engagement with a cam track on said plate. Referring to Figures 6 to 9 inclusive, the front face of this cam plate is formed with a raised land 94 which projects forwardly a substantial distance from the front of the plate.

The opposite ends of this land slope down to a depressed annular surface 95 which is stepped inwardly from the plane of the land a substantial distance, as shown in Figure 7. The leading edge of the land 94 joins with the annular surface 95 through a sloping surface 97, and the trailing edge of said land may also join with this annular surface through a sloping surface 98. The inner periphery of the plate is formed with a narrow inner rim or ledge 99, the outer edge of which lies in the same plane with the surface of the land 94. Particular attention is directed to the fact that as this ledge approaches the leading edge of the land 94 the outer peripheral wall of said ledge is cut inwardly on a curve 101 which almost reaches the inner peripheral wall of the ledge by the time it intersects the leading edge of the land 94. This inner rim 99 constitutes a safety ledge for positively preventing accidental repeating of the punch press. The latch roller 93, indicated partly in dotted lines, normally engages with the land 94 when the clutch parts are disengaged. In the tripping of the clutch, this roller is pulled downwardly along its axis x—x so as to cause the upper edge of the roller to clear the outer edge 94' of the land 94. This permits the pressure of the springs 81 to shift the cam plate and connected parts axially for causing engagement of the clutch cones. During the ensuing rotation of the crank shaft, the latch roller 93 is permitted to move upwardly into a position overlying the annular surface 95, but out of engagement therewith, the roller being spring pressed to hold the upper end thereof bearing against the outer peripheral wall of the safety ledge. Suitable spring means, to be later described, urges the latching roller upwardly into this position as soon as the operator removes his foot from the treadle 38 after tripping the clutch. As the cam plate approaches its normal position, the inwardly cut curve 101 in the outer wall of the safety ledge moves into position above the roller latch, whereby said roller is permitted to move inwardly or upwardly approximately at the same time that the leading cam slope 97 engages the roller and begins to force the cam plate backwardly. This inward feeding motion of the roller assures that the top surface of the roller will be abutting against the sleeve 86 by the time that the periphery of the roller is riding on the land 94. With proper spring pressure applied to the band brake 34, the cam plate will come to rest substantially in the position illustrated in Figure 6, at which time the crank 21a is approximately in its upper dead center position. However, if through inadequate pressure exerted on the brake, the crank continues to coast on through its dead center position, the resulting motion of the cam plate will bring the trailing cam slope 98 under the roller latch. Were it not for the safety ledge 99 at this time, the clutch would automatically re-engage itself and cause a repeat operation of the press. However, by virtue of the fact that the upper peripheral portion of the roller latch is now riding on the safety ledge 99, the clutch cannot become re-engaged until the operator intentionally trips the roller latch by stepping on the treadle 38. The spring pressure normally tending to thrust the roller latch inwardly to the upper position shown may be adequate to insure that the roller will follow the in-feed curve 101 for bringing the roller into position for riding on the safety ledge 99. However, as a precautionary measure, I propose arranging the roller so that its rotative contact with the leading edge slope 97 will exert a force which positively moves the roller inwardly. As best shown in Figure 6, this is accomplished by disposing the axis x—x of the roller non-radially with respect to the cam plate 91 and inclined in such direction relative thereto that rotative contact of the leading edge cam 97 and land 94 with the periphery of the roller exerts a positive force for causing the roller to move inwardly until the upper end thereof abuts the sleeve 86.

Figures 3, 12:
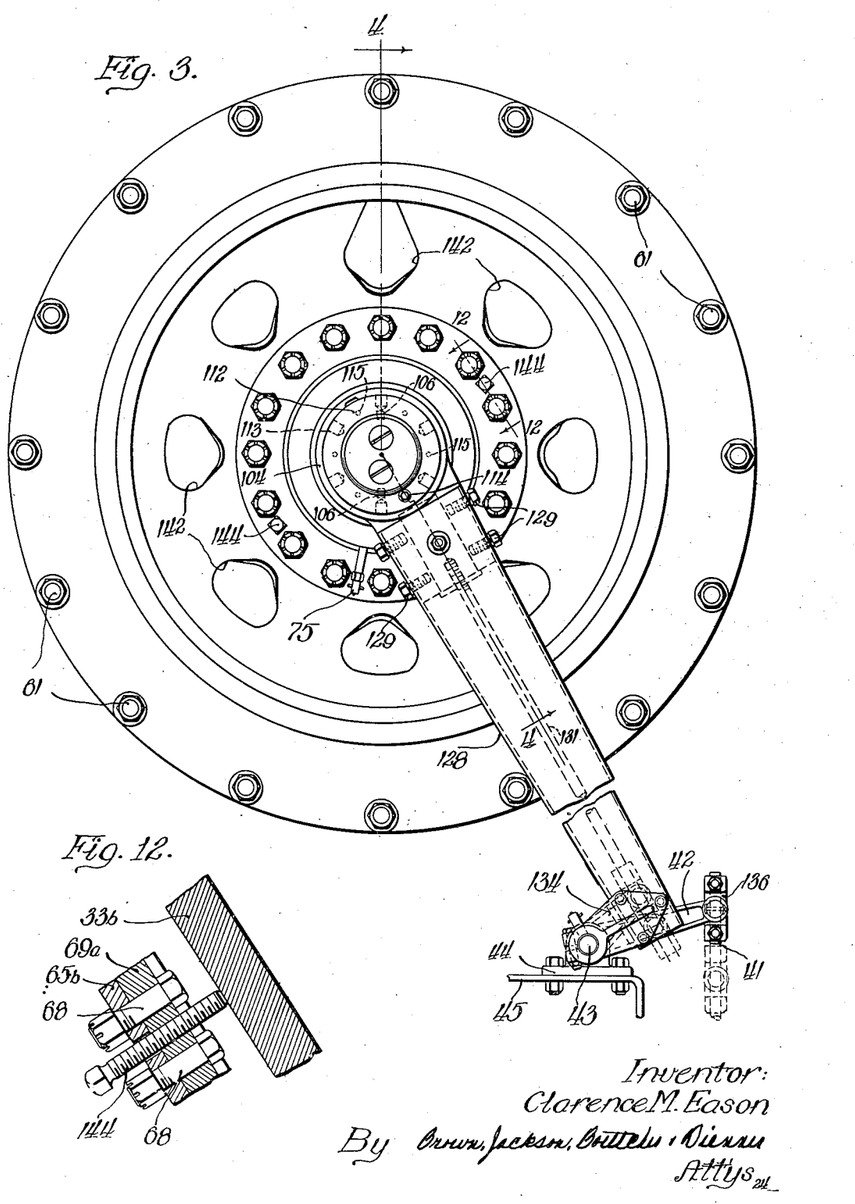
Figure 3 is an end elevational view of the clutch, on a larger scale.
Figure 12 is a detail sectional view taken approximately on the plane of the line 12—12 of Figure 3 showing improved means which may be provided for holding the clutch engaged during the operation of setting or adjusting the dies.

Referring now to the apparatus for adjusting the parts to compensate for wear of the clutch lining 64, it will be observed from Figures 3 and 4 that the roller latch 93 is reciprocably supported and guided within a housing 104 which is formed at its upper end with a circular ring portion 104a encircling the sleeve 86. Said ring portion is formed with a laterally extending annular flange 104b which partially encloses a thrust ring 105. The latter is compelled to rotate with the sleeve 86 during each rotation of the crank shaft through the provision of two diametrically opposite keys 106 (Figure 3), which are shown as being separate elements secured to the thrust ring by the rivets 107. These keys are slidable in longitudinal keyways 108 formed in the outer surface of the sleeve 86. The thrust ring 105 bears against the ring portion 104a and constitutes a rotatable abutment or end stop for the non-rotatable housing 104, for receiving the reaction pressure of the roller latch 93. If desired a snap ring 109 may be arranged to engage in an internal groove in the flange 104b and bear against the flanged inner end of the thrust ring 105 for preventing accidental outward displacement of the thrust ring from the housing structure. The outer end of the sleeve 86 is provided with a relatively fine thread 111 over which screws an adjusting nut 112 to serve as an adjustable abutment for the thrust ring 105. Said nut is provided with radial sockets 113 for the reception of a spanner wrench, and the nut is also drilled for receiving a locking screw 114 which is adapted to thread into any one of a plurality of tapped holes 115 provided in the side of the thrust ring 105. When the clutch lining 64 becomes sufficiently worn to require adjustment, the locking screw 114 is first removed and thereupon the nut 112 is screwed outwardly to back away the thrust ring 105, whereby the housing 104 and roller latch 93 are displaced outwardly to a sufficient distance to insure adequate pressure engagement between the cone surfaces when the clutch is in its engaged position. Conversely, any tendency of the clutch surfaces to drag when the clutch is in the disengaged position can be corrected by screwing the nut 112 inwardly. The interposition of the keyed non-rotating ring 105 between the non-rotating housing 104 and the rotating adjusting nut 112, and the locking of said adjusting nut to said keyed ring by the screw 114, definitely assures that under no circumstances can the nut 112 be accidentally backed away and thereby permit accidental engagement of the clutch.

The roller latch 93 preferably has a needle bearing mounting on a stem 116, the lower portion of which is threaded for reception in a tapped bore 117 formed in a reciprocable plunger 118. A set screw 119 secures the stem 116 in said bore. The plunger 118 is guided within a cylindrical bore 121 in the housing 104, and the plunger is held against rotation therein by a set screw 122 which has its inner end engaging in a longitudinal key slot 123 formed in the plunger. A lubricant nipple 124 screws into the housing 104 and communicates with an internal annular groove 125 formed within the plunger guiding bore 121. A radial duct 126 in the plunger normally communicates with the groove 125 and conducts lubricant therefrom into the axial threaded bore 117. From here the lubricant passes up through a small drill hole in the stem 116 and is then conveyed to the needle bearing on which the roller latch is mounted. A long channel-shaped reaction arm 128 is secured over the front side of the housing 104 and has its side flanges rigidly secured to said housing by cap screws 129, as shown in Figure 3. An actuating rod 131 extends downwardly within this channel arm, the upper end of said rod having a threaded connection 131' with the plunger 118. A compression spring 132 is confined between the lower end of the plunger and a bridge abutment 133 formed within the channel arm 128. As before described, this spring tends to restore the roller latch 93 to its upper or inner position after the clutch has been tripped. Riveted to the lower end of the channel arm 128 is an anchoring attachment 134 which has pivotal mounting at one end on the rock shaft 43, which rock shaft is journaled in bearings 44 secured to the laterally extending shelf bracket 45, as previously described. The pivotal mounting of the anchoring attachment 134 accommodates variations which may arise in the attachment of the bracket 45 to the press. Referring to Figure 10, the lower end of the actuating rod 131 has a pivot supporting sleeve 136 adjustably secured thereto. This sleeve can be rigidly secured to the rod in different shifted positions by the upper and lower set screws 137, the two set screws serving to insure that the sleeve will not accidentally slip along the rod. A pivot stud 138 projects from said sleeve and receives the outer end of a motion transmitting lever 139 entering one side of the channel arm 128, the other end of this lever being rigidly clamped to the rock shaft 43. The previously described rod 41 which extends up from the foot treadle 38 is also provided with an adjustable pivot supporting sleeve 136 which is likewise adjustably secured to the rod by the set screws 137. The swinging end of the motion transmitting arm or lever 42 is connected with the pivot stud 138 projecting from this latter sleeve member. The use of the two adjustable sleeve members 136 accommodates location of the shelf bracket 45 in different positions and also enables the levers 42 and 139 to be disposed in their most effective angular positions.

When it is desired to back up the ram during the operation of changing or setting dies, the two clutch elements can be connected together temporarily for rotation in either direction by hooking an appropriate clamp into one of the holes 142 in the web member 65 and clamping the same to the outer cone 62. A more effective way of temporarily securing the two clutch elements together for die setting purposes is to employ a pair of diametrically opposite screws 144 threading through tapped holes in the flange 69a of the outer servo member 69, as illustrated in Figure 12, corresponding to a section plane on the line 12—12 of Figure 3. These screws are of sufficient length so that by screwing them inwardly their inner ends are brought to bear against the web 33b of the bull gear, whereby the driven clutch cone 63 is forced outwardly in an axial direction for engagement with the driving clutch cone 62. In this operation, the roller latch 93 occupies its tripped position, and motion is imparted to the crank shaft either by hand or momentarily by power.

I have illustrated a representative set of upper and lower dies 146 and 147 mounted on the upper die head or ram and on the bed plate respectively. In many instances involving a shaping operation, the lower dies have a spring cushioned mounting with respect to the bed plate 15. The springs 148 represent such a set of cushioning springs, which usually consist of several very powerful springs capable of absorbing a large amount of energy. As previously remarked, this spring energy exerts an upward thrust or negative torque on the ram and crank shaft during a short part of the return motion of the ram, and this counter torque aids materially in releasing the servo mechanism. In this regard, it should be noted that a significant saving of power and a greater speed of operation can be obtained if all or the major portion of the energy stored in these cushion springs at the completion of the die operation can be returned to the flywheel or other driving parts on the up stroke of the ram. In the average press employing a jaw clutch, very little, if any, of this stored spring energy is regularly returned to the flywheel. This is because of the play ordinarily existing between the cooperating jaw teeth of the jaw clutch, and the relatively short stroke or range of deflection of said cushion springs. That is to say, the springs have usually expanded to the upper limit of their movement before such play is taken up between the jaw teeth as would enable the energy of the springs to be returned to the flywheel. In my improved friction clutch, no such play exists immediately upon the ram starting its up stroke, and hence all, or a substantial part, of the stored spring energy is returned to the driving parts in the act of assisting to release the servo mechanism. The utilization of such a counter torque, as developed by the aforementioned cushion springs, is not necessary in order to release the servo mechanism of my improved clutch, particularly when employing a pitch angle for the helical splines of approximately the degree previously stated. However, such counter torque can be effectively employed for releasing purposes in situations where it might be desired to use servo mechanism having a much steeper pitch angle for the helical splines, and, accordingly, it is within the purview of my invention to incorporate this cushion spring arrangement in presses which only perform punching operations, or in presses which only perform shaping or forming operations, in addition to the type of press here shown which performs both operations.

In the operation of the clutch, the two clutch elements are brought into initial power transmitting engagement by the pressure of the springs 81 as soon as the roller latch 93 is tripped. The pressure of this initial engagement is a factor in the total or final engaging pressure effected by the servo mechanism, and such pressure of initial engagement can be varied or adjusted by using either heavier or lighter springs 81, or by employing a greater or lesser number of these springs in the pockets 82. As soon as this initial engagement is established, all torque is thereafter transmitted through the servo mechanism. In the direction of rotation indicated by the arrow a in Figure 4, this results in the outer or driving servo member 69 screwing itself outwardly, i. e., to the right, along the coacting splines 73 of the inner or driven servo member 70. This shifting motion of the outer servo member, screwing itself to the right along the inner servo member, is transmitted to the driven clutch element 63 for forcing the two clutch surfaces into a greater pressure of engagement. The degree to which the outer servo member screws itself outwardly along the inner servo member, and hence the degree of pressure established thereby between the clutch surfaces, is a function of the torque transmitted. For example, the torque required to overcome the inertia of the crank shaft, ram and movable die will cause a certain degree of servo action, just sufficient to load the clutch to the point where it can carry this inertia torque. However, the peak of the torque load occurs upon the impact of the dies with the metal, and at this time the very heavy load on the inner servo member results in a slight, momentary slowing down of this driven servo member. In consequence of the resulting relative rotation between the driving and driven servo members, the driving member screws itself still further along the inner servo member and establishes a still higher pressure between the clutch surfaces for carrying the higher torque. Hence, if the torque load is not very high, the driving servo member is screwed outwardly only a relatively short distance, and if the load is greater it is screwed outwardly a greater distance. It will thus be seen that the servo action only loads the clutch to an amount sufficient to carry the torque. The degree to which this loading can be carried is, of course, a function of the angle of the helical splines 72, 73.

With regard to the action of the cushion springs 148 under the bed die tending to establish a releasing force in my improved clutch, it will be evident that the expansion force of these relatively heavy springs will impart a brief accelerating impetus to the upper die and ram during the early part of the up-stroke of the latter. This accelerating force tends to cause the inner or driven servo member 70 to run ahead of the outer or driving servo member 69. Hence, the driving and driven relation of the members is momentarily reversed, in consequence of which the inner servo member 70 endeavors to screw itself toward the right within the outer servo member, but inasmuch as this inner servo member can have no shifting movement, the outer servo member is screwed backwardly toward the left. This motion establishes a releasing force in the clutch. The foregoing feature of establishing a releasing force through cushioning springs or other counter-torque creating means is an optional feature in my invention, although it may be very advantageous in constructions in which the helical splines 72, 73 have a relatively steep pitch angle, such steeper pitch angle otherwise requiring that a greater releasing force be created by the cam and roller latch mechanism.

A punch press employing my improved cone clutch can be operated at a substantially higher speed than a press employing a conventional jaw clutch. Obviously, the friction characteristic of a cone clutch avoids the high starting shock of a jaw clutch, thereby enabling the parts to be driven at a higher speed. Moreover, the cushioned engagement of my improved cone clutch, first by spring pressure and later by servo action, also enables the drive to be at a higher speed. Furthermore, the fact that the energy stored in the cushion springs 148 is returned to the ram on its up-stroke also results in a higher speed. Still another reason resides in the fact that the operator knows that the present clutch will engage instantly upon the treadle 38 being depressed. In the case of conventional jaw clutches, there is such an appreciable play between the jaw teeth that the operator does not know for certain whether the engagement of the clutch will occur with the play taken up or whether the play must first be taken up before the teeth engage, and hence safety requires that the treadle be not depressed until the work is completely positioned, with the result that in the latter instance when the clutch parts come together with play intervening between the clutch teeth the downward movement of the ram is delayed an appreciable interval.

A press utilizing my improved clutch can, of course, be made to repeat continuously by holding the treadle 38 depressed.

It should be noted that when my improved cone clutch is incorporated in a back geared press, as shown, the shock and wear occurring upon impact of the dies with the metal is distributed uniformly to all of the peripheral teeth in the bull gear 33. This is a decided advantage over the action that occurs with a jaw clutch, because in the case of a jaw clutch having two jaws the impact load is necessarily concentrated on one of two teeth in the bull gear, and in the case of a jaw clutch having four jaws this load is always concentrated on one of four teeth in the gear.

It should also be noted that the servo action only loads the clutch to an amount sufficient to perform the work, and no more. That is to say, if the work being done in the press only requires half as much pressure as the calculated normal pressure, the force urging the clutch surfaces together will only be half of the normal force. This results in increased life of the clutch lining and other parts of the clutch.

While I have illustrated and described what I regard to be the preferred embodiment of my invention, nevertheless it will be understood that such is merely exemplary and that numerous modifications and rearrangements may be made therein without departing from the essence of the invention. For example, the clutch might be interposed in the length of the countershaft 31, or might be interposed between this countershaft and the flywheel 29. However, from the standpoint of wear, this is less advantageous than the arrangement shown because with such location of the clutch the impact load is always concentrated on one tooth of the bull gear 33. It is also within the scope of the invention to employ my improved servo mechanism and my improved control mechanism in a disk clutch or in other types of friction clutches, but I regard a cone clutch to be the preferred form of friction clutch for punch press operation.

I claim:

1. In a cone clutch for a press of the class described wherein the clutch is mounted on the crank shaft of the press, the combination of driving and driven cone clutch elements, servo mechanism comprising coacting inner and outer helically splined members interposed between the driven element of the clutch and said crank shaft, the helical splines of said members being inclined at less than a forty-five degree angle to the axis of the clutch so as to facilitate axial release of said servo mechanism, spring means for effecting initial engagement of said clutch, said spring means transmitting its thrust in a direction axially of the clutch to avoid imposing spring torque on either of said clutch elements, said servo mechanism acting after the initial engagement of the clutch by said spring means to cause a higher pressure of engagement of the clutch under the impact torque of the press, said servo mechanism being axially releasable under all operating conditions, and cam and roller latch mechanism for controlling the engaging and releasing of the clutch.

2. In a press of the class described, the combination of a crank shaft, a cone clutch for driving said crank shaft comprising a shiftable clutch element, servo mechanism utilizing the torque transmitted to the press for exerting axial shifting force on said shiftable clutch element, control mechanism for controlling the engaging and releasing of said clutch, and adjusting mechanism for adjusting the normal disengaged position of said shiftable clutch element, said adjusting mechanism arranged to have its reaction pressure borne by said crank shaft.

3. In clutch mechanism of the class described, the combination of a shaft, a cone clutch mounted on said shaft, servo mechanism utilizing the torque transmitted to the load for applying engaging pressure to said clutch, control mechanism for controlling the engaging and releasing of said clutch comprising a cam track and a roller latch cooperating with said cam track, a housing supporting said roller latch, and adjusting means having its reaction pressure borne by said shaft and operative to adjust the position of said housing axially of said shaft.

4. In clutch mechanism of the class described, the combination of a shaft, a bearing for said shaft, a driving member mounted for independent rotation on said shaft, a cone clutch for operatively connecting said driving member with said shaft, servo mechanism utilizing the torque transmitted to said shaft for imparting engaging pressure to said clutch, and an adjustable thrust plate interposed between said bearing and said driving member and arranged for shiftable adjustment to adjust the axial position of said driving member on said shaft.

5. In clutch mechanism for a press or the like, the combination of a shaft, a clutch assembly mounted on said shaft comprising a flywheel on said shaft, a driving clutch cone rotating with said flywheel, and a driven clutch cone operative to transmit rotation to said shaft, said shaft extending through said flywheel and terminating just beyond said clutch cones, said cones being tapered in a direction such that clutch engaging pressures are confined entirely within said clutch assembly, means for creating an initial engaging pressure between said cones, servo mechanism utilizing the torque transmitted to the press for increasing the engaging pressure between said cones, and control mechanism mounted on the outer end of said shaft for controlling the engaging and releasing of said clutch.

6. In clutch mechanism for a press of the class described, the combination of a cone clutch comprising driving and driven clutch elements operative to transmit power to said press, spring means for engaging said clutch elements, servo mechanism responsive to the torque transmitted to the press for increasing the pressure of engagement between said clutch elements, a cam plate rotating with said driven clutch element and operative to transmit axial shifting force thereto for disengaging said clutch elements, and a roller latch cooperating with said cam plate mounted for rotation and axial shifting motion about an axis disposed non-radially of said cam plate and inclined in a direction such that rotative contact between said cam plate and said roller latch tends to feed said roller latch inwardly towards the center of said cam plate.

7. In clutch mechanism for a press of the class described, the combination of a cone clutch comprising driving and driven clutch elements operative to transmit power to said press, spring means for effecting initial engagement between said clutch elements, servo mechanism responsive to the torque transmitted to said press for thereafter increasing the pressure engagement between said clutch elements, a cam plate rotating with said driven clutch element and operative to transmit axial shifting motion thereto for disengaging said clutch elements, and a roller latch cooperating with said cam plate, said cam plate comprising a land on which said roller normally engages in the disengaged condition of the clutch, and comprising an annular safety ledge located at the inner radius of said land, said safety ledge having its outer wall cut inwardly at a point adjacent to the leading edge of said land, whereby said roller can shift inwardly to dispose its inner end on the radius of said safety ledge when said land revolves to a position under said roller.

8. In clutch mechanism for a press of the class described, the combination of a press ram, a friction clutch comprising driving and driven clutch elements for transmitting power to the press ram, servo mechanism responsive to the driving torque imparted to said ram for transmitting engaging pressure to said clutch, said servo mechanism being incapable of transmitting engaging pressure to said clutch in the event of backward rotation, trip mechanism for controlling said clutch, and means for temporarily holding said clutch elements in engagement when it is desired to move said ram backwardly or forwardly to different positions in die setting operations.

9. In combination, a cone clutch for transmitting power to a load, servo mechanism operating to transmit an engaging pressure to said clutch which is substantially proportional to the driving torque of the load, said servo mechanism comprising helical splines inclined at an angle of approximately twenty-three degrees, and cam and roller mechanism for releasing said clutch.

10. In combination, friction clutch mechanism for transmitting power to a load, means responsive to driving torque for transmitting an axial shifting force to said clutch mechanism in one direction for creating clutch engaging pressure therein, and control mechanism operative to effect engagement of said clutch mechanism for a predetermined degree of rotation and to thereupon transmit an axial shifting force to said clutch mechanism in the opposite direction for automatically releasing said clutch mechanism.

11. In combination, a friction clutch for transmitting power to a load, servo mechanism responsive to the driving torque of the load for transmitting engaging pressure to said clutch, and means associated with the load for creating a counter torque which exerts a force in a releasing direction on said servo mechanism.

12. In combination, a clutch comprising driving and driven clutch elements, and control mechanism for said clutch comprising a cam plate rotating with said driven clutch element and operative to transmit axial shifting force thereto for disengaging said clutch elements, and a roller latch cooperating with said cam plate mounted for rotation and axial shifting motion about an axis disposed non-radially of said cam plate and inclined in a direction such that rotative contact between said cam plate and said roller latch tends to feed said roller latch inwardly towards the center of said cam plate.

13. In combination, a clutch comprising driving and driven clutch elements, and control mechanism for said clutch comprising a cam plate rotating with said driven clutch element and operative to transmit axial shifting motion thereto for disengaging said clutch elements, and a roller latch cooperating with said cam plate, said cam plate comprising a land on which said roller latch normally engages in the disengaged condition of the clutch, and an annular safety ledge located at the inner radius of said land, said safety ledge having its outer wall cut inwardly at a point adjacent to the leading edge of said land, whereby said roller can shift inwardly to dispose its inner end on the radius of said safety ledge when said land revolves to a position under said roller.

14. In clutch mechanism, the combination of a frame, a shaft journaled therein and having one end extending therefrom, a flywheel rotatably mounted on the end of said shaft, a clutch element rotating with said flywheel, a coacting shiftable clutch element rotating with said shaft, and servo mechanism mounted on the outer end of said shaft beyond said flywheel, said servo mechanism utilizing the torque of the load to impart shifting force to said shiftable clutch element in a clutch engaging operation, said clutch elements being arranged so that they are engaged when the shiftable clutch element is moved in a direction away from said flywheel, and said servo mechanism being arranged so that its reaction pressure incident to such clutch engaging operation is transmitted in a direction towards said flywheel, whereby the clutch engaging pressures are confined entirely within the clutch assembly.

15. In combination, a cone clutch for transmitting power to a load, the coacting friction surfaces of said clutch being inclined at a cone angle of approximately fourteen degrees from the clutch axis, servo mechanism operating to transmit an engaging pressure to said clutch which is substantially proportional to the driving torque of the load, said servo mechanism comprising helical splines inclined at an angle of approximately twenty-three degrees from the clutch axis, and cam and roller latch mechanism for releasing said clutch.

16. In combination, a cone clutch for transmitting power to a load, the coacting friction surfaces of said clutch being inclined at a cone angle of approximately fourteen degrees from the clutch axis, servo mechanism operating to transmit an engaging pressure to said clutch which is substantially proportional to the driving torque of the load, said servo mechanism comprising helical splines inclined at an angle of approximately twenty-three degrees from the clutch axis, and control mechanism operative to effect engagement of said clutch for a predetermined degree of rotation and to thereupon transmit an axial shifting force to said servo means and said clutch for automatically releasing said clutch, said control mechanism comprising a cam ring and rotatable means having rolling contact with said ring.

17. In combination, a cone clutch for transmitting power to a load, servo mechanism operating to transmit an engaging pressure to said clutch which is substantially proportional to the driving torque of the load, said servo mechanism comprising helical splines inclined at an angle of approximately twenty-three degrees, and control mechanism operative to effect engagement of said clutch for a predetermined degree of rotation and to thereupon transmit an axial shifting force to said servo means and said clutch for automatically releasing said clutch, said control mechanism comprising a cam ring and rotatable means having rolling contact with said ring.

18. In a punch press, the combination of a press ram, a crank shaft for driving said press ram, a driving member mounted on said crank shaft, a cone clutch for coupling said driving member with said crank shaft, said cone clutch comprising driving and driven clutch elements, one of which is shiftable, spring means for effecting initial engagement of said clutch, servo mechanism responsive to torque transmitted to said press ram for effecting high pressure engagement of said clutch, said servo mechanism having a pitch angle of less than forty-five degrees relatively to the axis of the clutch whereby said servo mechanism is freely releasable by the application of an axial end thrust thereto, and clutch control mechanism comprising means utilizing the kinetic energy of said press ram and crank shaft for creating an axial end thrust which is applied to said shiftable clutch element and to said servo mechanism for positively shifting said shiftable clutch element in a clutch releasing direction, and in which said axial end thrust is completely self-contained within the crank shaft and driven clutch element, thereby allowing the driving element to revolve entirely free of axial thrust and allowing the crank shaft to come to rest entirely free of imposed torque loads.

19. In a punch press, the combination of a press ram, a crank shaft for driving said press ram, a driving member mounted on said crank shaft, a cone clutch for coupling said driving member with said crank shaft, said cone clutch comprising driving and driven clutch elements, one of which is shiftable, spring means for effecting initial engagement of said clutch, servo mechanism responsive to torque transmitted to said press ram for effecting high pressure engagement of said clutch, and clutch control mechanism comprising means utilizing the kinetic energy of said press ram and crank shaft for creating an axial end thrust which is applied to said shiftable clutch element and to said servo mechanism for positively shifting said shiftable clutch element in a clutch releasing direction, and in which said axial end thrust is completely self-contained within the crank shaft and driven clutch element, thereby allowing the driving element to revolve entirely free of axial thrust and allowing the crank shaft to come to rest entirely free of imposed torque loads.

20. In a punch press, the combination of a press ram, a crank shaft for driving said press ram, a driving member mounted on said crank shaft, a cone clutch for coupling said driving member with said crank shaft, said cone clutch comprising driving and driven clutch elements, said driven element being axially shiftable, spring means for effecting initial engagement of said clutch, said spring means transmitting its thrust in a direction axially of the clutch to avoid imposing spring torque on either of said clutch elements, servo mechanism responsive to torque transmitted to said press ram for effecting high pressure engagement of said clutch, said servo mechanism having a pitch angle of less than forty-five degrees relatively to the axis of the clutch whereby said servo mechanism is freely releasable by the application of an axial end thrust thereto, and clutch control mechanism comprising a cam ring rotatable coaxially of said clutch and thrusting means adapted to have rolling contact with said cam ring, said control mechanism utilizing the kinetic energy of said press ram and crank shaft for creating an axial end thrust which is applied to said shiftable clutch element and to said servo mechanism for positively shifting said shiftable clutch element in a clutch releasing direction, and in which said axial end thrust is completely self-contained within the crank shaft and driven clutch element, thereby allowing the driving element to revolve entirely free of axial thrust and allowing the crank shaft to come to rest entirely free of imposed torque loads after the clutch has been disengaged.

21. In clutch mechanism for a press of the class described, the combination of a press ram, a friction clutch comprising driving and driven clutch elements for transmitting power to the press ram, one-cycle stop control mechanism for engaging said friction clutch for a predetermined cycle of movement and then automatically releasing said clutch, and means separate from said control mechanism for temporarily holding said clutch engaged when it is desired to move said ram backwardly or forwardly to different positions in die setting operations.

22. In a press of the class described, the combination of a crank shaft, a cone clutch for driving said crank shaft comprising a shiftable clutch element, servo mechanism utilizing the torque transmitted to the press for exerting axial shifting force on said shiftable clutch element, and control mechanism for controlling the engaging and releasing of said clutch, said control mechanism arranged to have its reaction pressure borne by said crank shaft.

23. In combination, friction clutch mechanism for transmitting power to a load, comprising driving and driven friction clutch elements, one of which is shiftable into and out of clutching engagement with the other, servo means responsive to substantially the entire torque load transmitted through said clutch for imparting an axial shifting force to said shiftable clutch element in the clutch engaging direction for obtaining a relatively high engaging pressure between said clutch elements, and control mechanism operative to effect engagement of said clutch mechanism for a predetermined degree of rotation and to thereupon transmit an axial shifting force to said shiftable clutch element in the opposite direction for automatically releasing said clutch mechanism.

24. In clutch mechanism, the combination of a driving wheel, a driven shaft on which said wheel is rotatably mounted, a friction cone clutch for clutching said driving wheel to said shaft comprising a driving cone secured to said driving wheel and a coacting relatively shiftable driven cone arranged to drive said shaft, said cones being arranged whereby the clutch is engaged by axial shifting movement of said driven cone in a direction away from said driving wheel, and said clutch is disengaged by axial shifting movement of said driven cone in a direction toward said driving wheel, spring means for initially engaging said clutch cones, servo mechanism responsive to substantially the entire torque load transmitted through the clutch for imparting an axial shifting force to said shiftable driven cone in said clutch engaging direction for obtaining a relatively high engaging pressure between said clutch cones, and control mechanism operative to effect engagement of said clutch cones for a predetermined degree of rotation and to thereupon transmit an axial shifting force to said shiftable driven cone in the opposite direction for automatically releasing said clutch cones.

CLARENCE M. EASON.